(12) United States Patent
Baehrle-Miller et al.

(10) Patent No.: US 9,694,799 B2
(45) Date of Patent: Jul. 4, 2017

(54) METHOD FOR SETTING THE CLAMPING FORCE OF A HYDRAULICALLY SUPPORTED ELECTRIC MOTOR-DRIVEN PARKING BRAKE

(75) Inventors: Frank Baehrle-Miller, Schoenaich (DE); Dieter Blattert, Kirchheim/Neckar (DE); Peter Blessing, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1077 days.

(21) Appl. No.: 13/390,295

(22) PCT Filed: Jun. 14, 2010

(86) PCT No.: PCT/EP2010/058274
§ 371 (c)(1),
(2), (4) Date: May 1, 2012

(87) PCT Pub. No.: WO2011/018256
PCT Pub. Date: Feb. 17, 2011

(65) Prior Publication Data
US 2012/0205202 A1 Aug. 16, 2012

(30) Foreign Application Priority Data
Aug. 13, 2009 (DE) .......................... 10 2009 028 505

(51) Int. Cl.
*B60T 13/58* (2006.01)
*B60T 13/74* (2006.01)
(Continued)

(52) U.S. Cl.
CPC .......... *B60T 13/588* (2013.01); *B60T 13/746* (2013.01); *F16D 2121/02* (2013.01); *F16D 2121/24* (2013.01)

(58) Field of Classification Search
CPC ...... B60T 13/588; B60T 13/74; B60T 13/741; B60T 13/746
(Continued)

(56) References Cited

U.S. PATENT DOCUMENTS 7,744,166 B2 * 6/2010 Leiter et al. .............. 188/106 P
7,992,691 B2 * 8/2011 Maron et al. ................. 188/156
(Continued)

FOREIGN PATENT DOCUMENTS

| DE | 10345485 A1 | | 4/2005 |
|---|---|---|---|
| DE | 102005042282 | * | 3/2007 |

(Continued)

OTHER PUBLICATIONS

International Search Report for PCT/EP2010/058274, dated Sep. 29, 2010.

*Primary Examiner* — Thomas J Williams
(74) *Attorney, Agent, or Firm* — Gerard Messina

(57) ABSTRACT

A method for setting the clamping force acting on a wheel brake, a part of the clamping force being provided using an electromechanical brake device and simultaneously another part of the clamping force being provided using a hydraulic brake device. During an application procedure, the power consumption of the electric motor-driven brake device is regulated to an essentially constant value in an operating phase (phase 4), in which both brake devices simultaneously exert force, so as to set the clamping force of the parking brake very precisely.

12 Claims, 3 Drawing Sheets

(51) Int. Cl.
*F16D 121/02* (2012.01)
*F16D 121/24* (2012.01)

(58) Field of Classification Search
USPC ......... 188/72.6, 72.7, 72.8, 156, 157, 106 F, 188/106 P, 265
See application file for complete search history.

(56) References Cited

U.S. PATENT DOCUMENTS

| | | | | |
|---|---|---|---|---|
| 8,448,756 | B2* | 5/2013 | Knechtges | 188/72.8 |
| 8,521,388 | B2* | 8/2013 | Baehrle-Miller | B60T 7/042 |
| | | | | 701/70 |
| 2007/0158148 | A1* | 7/2007 | Ohtani et al. | 188/158 |
| 2009/0133975 | A1* | 5/2009 | Gilles | 188/72.6 |
| 2013/0001027 | A1* | 1/2013 | Baehrle-Miller et al. | 188/106 F |
| 2013/0056315 | A1* | 3/2013 | Bieltz et al. | 188/106 P |
| 2015/0066324 | A1* | 3/2015 | Baehrle-Miller | B60T 13/662 |
| | | | | 701/70 |
| 2015/0239439 | A1* | 8/2015 | Sussek | B60T 8/171 |
| | | | | 701/70 |
| 2016/0025169 | A1* | 1/2016 | Holder | F16D 65/18 |
| | | | | 188/162 |

FOREIGN PATENT DOCUMENTS

| | | |
|---|---|---|
| DE | 102006056346 A1 | 6/2007 |
| DE | 102008052847 A1 | 5/2009 |
| EP | 1697188 B1 | 6/2007 |
| EP | 1929170 B1 | 3/2009 |
| JP | 2001-71880 | 3/2001 |
| JP | 2006-528312 | 12/2006 |
| JP | 2007-22395 | 2/2007 |
| JP | 2007-177996 | 7/2007 |
| WO | WO 2009/053430 | 4/2009 |
| WO | WO 2009053429 A1 * | 4/2009 |

* cited by examiner

METHOD FOR SETTING THE CLAMPING FORCE OF A HYDRAULICALLY SUPPORTED ELECTRIC MOTOR-DRIVEN PARKING BRAKE

FIELD OF THE INVENTION

The present invention relates to a method for setting the clamping force exerted by a hydraulically supported parking brake.

BACKGROUND INFORMATION

Automatic parking brakes (APB) may include an operating element, such as a button, using which the parking brake may be locked or disengaged. Upon operation of the operating element, a control unit connected thereto recognizes the parking brake command and accordingly activates a final control element, such as a hydraulic pump or an electric motor, to build up brake force on the wheels of the vehicle or to disengage the brake.

It is understood that there are automatic parking brakes (APB) in which electric motors are located directly on the brake caliper of the wheel brakes (so-called "motor-on-caliper"). The electric motors act via a gearing, such as a spindle drive, directly on the brake piston of the hydraulic brake system and therefore can apply or disengage the service brake. The electric motors are typically dimensioned in such a way that their clamping force is sufficient to hold a vehicle on slopes of at least 20% without energy, as required by law.

In addition, it is understood that there are parking brake systems in which the electric motors are designed more weakly. In order to nonetheless be able to achieve the required clamping force, the electric motors are supported by the hydraulic pump of the hydraulic service brake system. During an application procedure of the parking brake, the electric motors are first operated and the hydraulic pump is switched on after a specific amount of time. The clamping force may thus be amplified up to the required value.

In the last-mentioned APB systems having hydraulic support, however, it is problematic that the total clamping force can only be determined relatively imprecisely or only with high sensory outlay.

SUMMARY OF THE INVENTION

It is therefore the object of the exemplary embodiments and/or exemplary methods of the present invention to provide a method and a device for setting the clamping force exerted by a parking brake, using which the clamping force may be set very precisely with little effort.

This object may be achieved according to the exemplary embodiments and/or exemplary methods of the present invention by the features described herein. Further embodiments of the present invention are provided in the further description herein.

The exemplary embodiments and/or exemplary methods of the present invention provide that a method for setting the clamping force (F) exerted by a parking brake be implemented, in which in an operating phase, in which both the electric motor and also the actuator (e.g., a hydraulic pump) of a second brake device simultaneously exert force; the power consumption (i) of the electric motor-driven brake device is regulated to an essentially constant value. This is because the torque of the electric motor and therefore also the speed are essentially constant in the case of constant power consumption. The distance covered by the brake piston may be calculated very precisely from the constant speed (in consideration of a transmission ratio). A desired clamping force which rises approximately proportionally to the distance may thus be set precisely. The current regulation therefore has the advantage that the clamping force may be set very precisely without requiring additional sensors.

According to a specific embodiment of the present invention, a current regulator is provided, which uses the actuator of the second (e.g., hydraulic) brake device as a final control element. Through variation of the hydraulic pressure, it is possible to relieve the electric motor of the parking brake to different extents. The drive torque of the electric motor and therefore also its power consumption may therefore be kept at an essentially constant value.

According to the exemplary embodiments and/or exemplary methods of the present invention, a distance (s) covered by the brake piston, a speed ($\omega$) of the electric motor, or another variable, with the aid of which the clamping force (F) may be estimated, is ascertained from the current value (i) in the operating phase, in which both brake devices simultaneously exert force.

According to the exemplary embodiments and/or exemplary methods of the present invention, the electric motor-driven brake device may be exclusively operated in a first operating phase of an application procedure. After reaching a specific target clamping force ($F_m$), the hydraulic brake device may be switched on. The target clamping force may fundamentally be any threshold value, which may be close to the maximum clamping force of the electric motor. The actual clamping force of the parking brake may be estimated in the first operating phase from the motor current, the speed, and various motor parameters.

During the first operating phase, in which exclusively the electric motor-driven brake device is active, the slope (m) of the clamping force increase may be ascertained. With the aid of the slope (m), a setpoint distance ($s_{ch0}$) may then be calculated, which the brake piston is to travel after reaching the target brake force ($F_m$), until the desired total clamping force is reached.

The distance (s) covered by the brake piston may be estimated in consideration of the current value (i). The speed of the electric motor may be first estimated from the current value and the covered distance (s) is calculated therefrom. Alternatively, covered distance (s) or motor speed ($\omega$) may also be ascertained using an incremental encoder, which may be attached to the motor axle. The incremental encoder may be designed on a magnetic basis, for example. In this case, an alternating magnetic field which is provided by a magnetic rotor situated on the motor axle or on any other gear stage, for example, is detected using a Hall element, for example. Alternatively, the incremental encoder may also be designed on an optical basis. In this case, for example, a barcode disc, which may be attached on the motor axle or on any other gear stage, is detected using optical read elements, for example.

A differential value ($\Delta s$) may be produced and continuously calculated from the actually covered distance and the setpoint distance ($s_{ch0}$). As long as the differential value is not equal to zero, the current regulation may be still performed. As soon as the differential value is zero, the electric motor and the hydraulic pump may be turned off.

The control algorithm may be implemented as software on a control unit. The control unit has appropriate interfaces to sensors, e.g., a current and voltage sensor, as well as an output for outputting a control variable for the hydraulic pump or a signal to an external regulator.

Exemplary embodiments, from which further features according to the present invention may result, but to which the present invention is not limited in its scope, are shown in the drawings.

DETAILED DESCRIPTION

Figure 1:
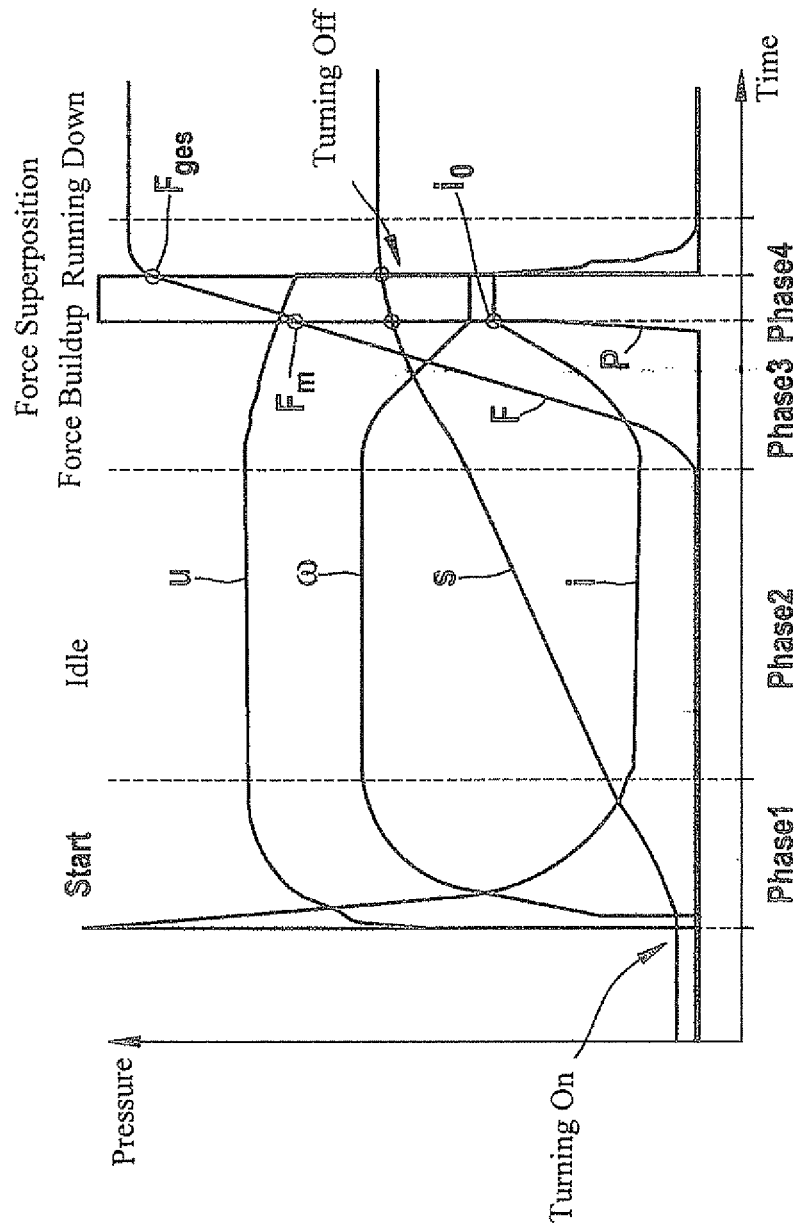
FIG. 1 shows the time curve of various operating variables of a parking brake during an application procedure of the brake.

FIG. 1 shows the time curve of various operating variables of a parking brake during an application procedure of the brake. The application procedure may essentially be divided into four phases:

At the beginning of a phase 1, an application command is recognized and electric motor 1 installed on the wheel brake is turned on. When electric motor 1 is turned on, a starting current peak is recognizable. Current i of electric motor 1 then drops in the further curve until an idle current results at the end of phase 1. Speed ω of electric motor 1 rises in phase 1, i.e., electric motor 1 is accelerated. At the end of phase 1, speed ω of electric motor 1 reaches an idle speed. Voltage u of electric motor 1 also rises. An idle voltage results at the end of phase 1. A nut is moved in the direction of a brake piston of the wheel brake by the rotation of a spindle. Since the nut is not yet in contact with the piston floor, clamping force F is equal to zero. Pressure p of hydraulic pump 7 is also zero in this phase.

Phase 2 is an idle phase, in which an idle current, an idle voltage, and an idle speed result. The clamping force of the wheel brake is still zero in this phase, since the nut is not yet in contact with the piston floor. Pressure p of hydraulic pump 7 is still equal to zero.

The force buildup occurs in phase 3. The nut is in contact with the piston floor and the piston is pressed against the brake disc by the rotation of the spindle. During this process, current i of electric motor 1 rises. Voltage u of electric motor 1 drops slightly in this phase from the level of the idle voltage because of the load of electric motor 1. Speed ω of electric motor 1 also drops with increasing clamping force buildup. Shortly before a predefined target clamping force $F_m$ is reached, hydraulic pump 7 is switched on and a hydraulic pressure p is therefore built up. Target clamping force $F_m$ may have a value, for example, which is close to the maximum clamping force of electric motor 1.

Phase 4 begins upon reaching target clamping force $F_m$. In this phase, both brake systems are active and electric motor 1 is supported by hydraulic pump 7. The total clamping force is composed of a component of electric motor 1 and a component of hydraulic pump 7. Current $i_0$ of electric motor 1 is regulated to an essentially constant value in phase 4. Hydraulic pressure p rises until a predefined total clamping force is reached. Electric motor 1 and the pump motor of the hydraulic brake device are then turned off. Accordingly, hydraulic pressure p, current i, voltage u, and speed ω of electric motor 1 drop to zero. Total clamping force $F_{ges}$ is maintained.

Figure 2:
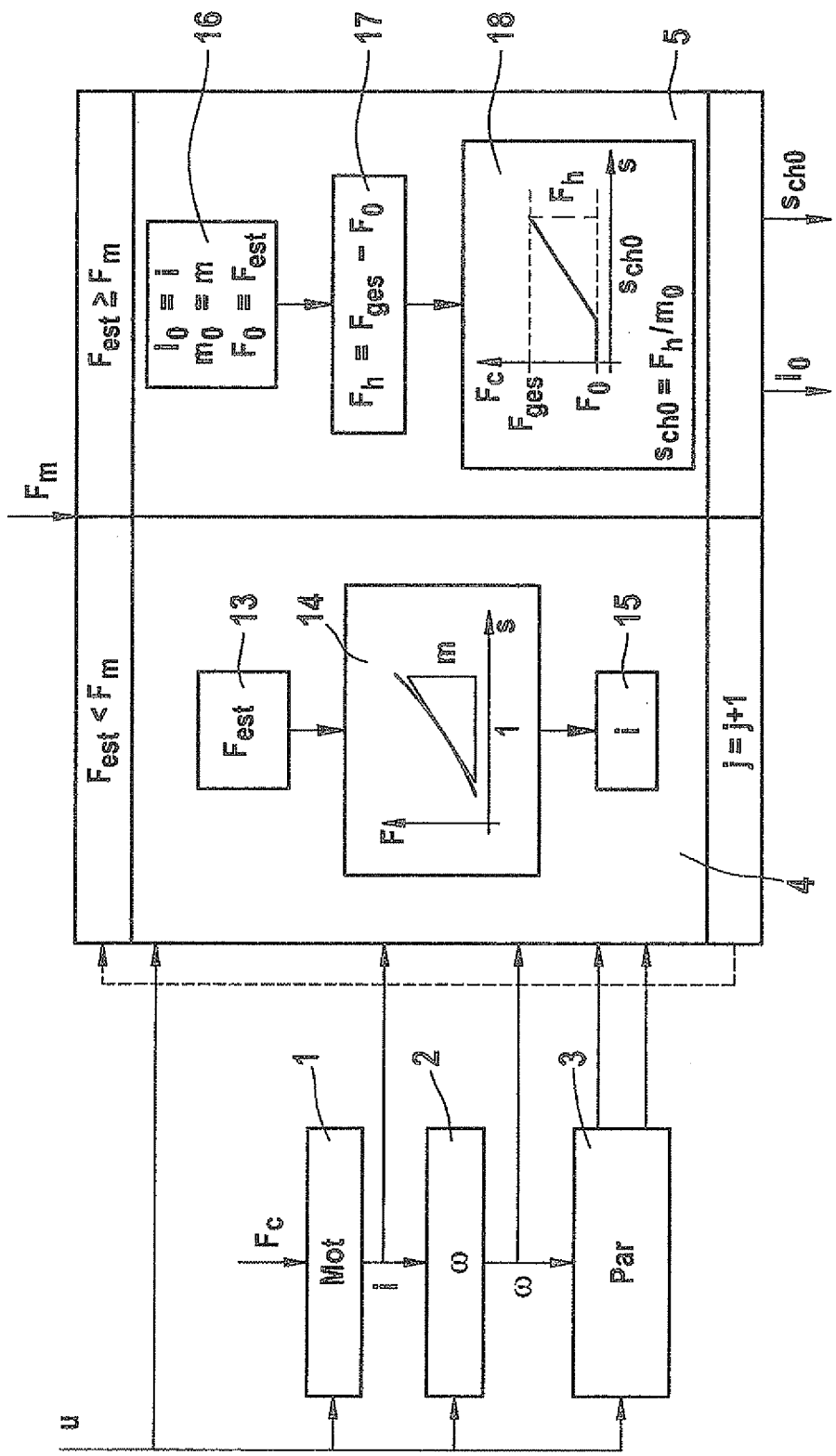
FIG. 2 shows a schematic view of the calculation of a setpoint distance ($s_{ch0}$) to be covered by the brake piston.

FIG. 2 shows a schematic view of the calculation of a setpoint distance $s_{ch0}$ to be covered by the brake piston. The setpoint distance is the distance which is still to be covered by the piston after reaching target brake force $F_m$ in order to reach a specific total clamping force.

In the exemplary embodiment shown, the actual motor torque is estimated from measured current value i, a speed ω (block 2) estimated from current i, and further motor parameters (block 3), such as an instantaneous motor constant $k_M$ and a motor resistance $R_M$. If a gear reduction of the transmission and the efficiencies of the mechanical chain are known, instantaneous clamping force $F_{est}$ may thus be estimated in step 13. A suitable iterative algorithm 4 is provided for this purpose. In addition, this algorithm 4 calculates slope m of the clamping force over distance s in step 14.

As soon as the estimated clamping force has reached the value of target clamping force $F_m$, the instantaneous current value is stored in step 15 and is output in step 16 as setpoint value $i_0$ for a current regulation. Upon reaching target clamping force $F_m$, in step 16, instantaneous slope $m=m_0$ and instantaneous clamping force $F_{est}=F_0=F_m$ are additionally stored in step 16, as well. From slope m and desired total clamping force $F_{ges}$, setpoint distance $s_{ch0}$ is calculated in steps 17 and 18, which the piston must still cover to reach the desired total clamping force. Setpoint distance $s_{ch0}$ results in step 18 from a calculation $s_{ch0}=(F_{ges}-F_m)/m$, $F_{ges}$ being the desired total clamping force, $F_m$ being the target clamping force, and m being the slope of the force increase over distance s covered by the piston.

Figure 3:
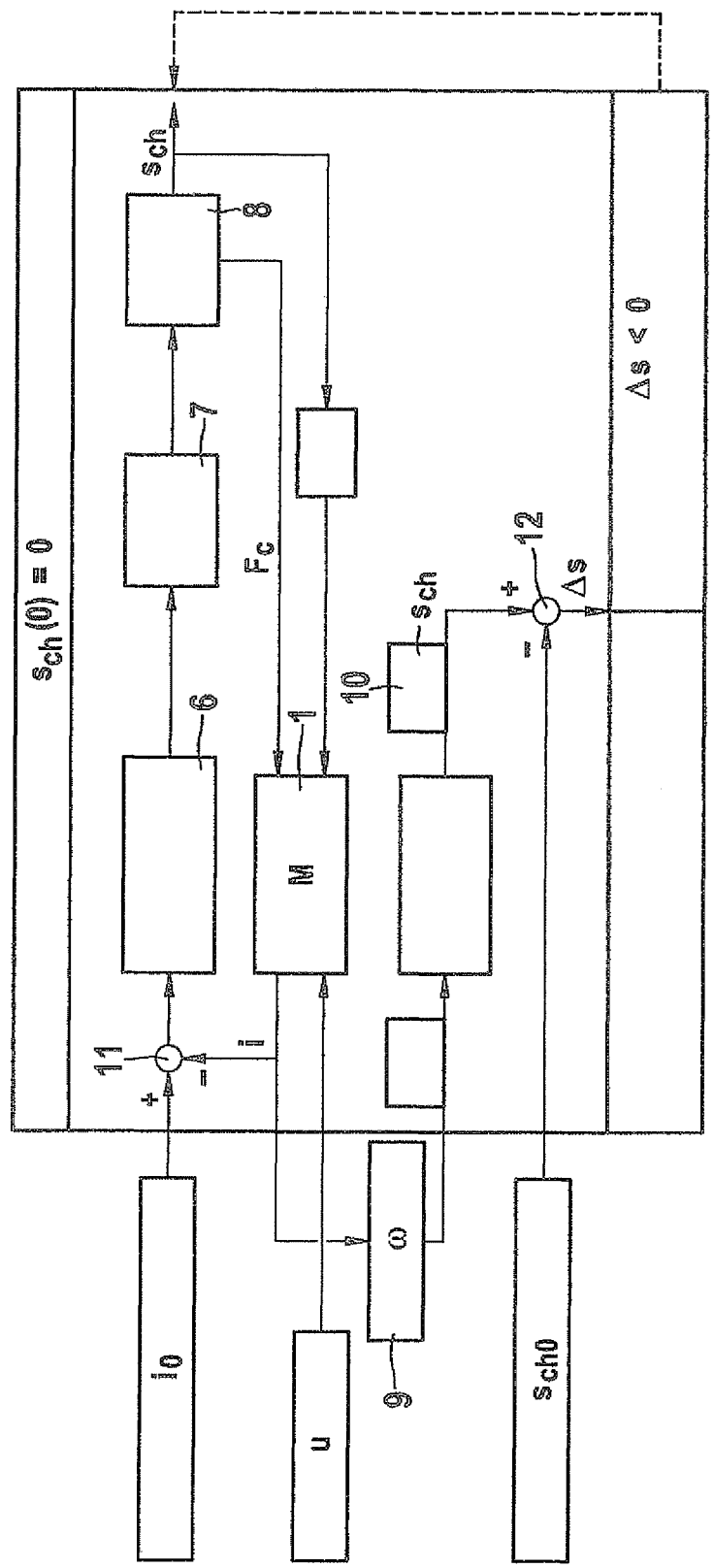
FIG. 3 shows a schematic view of a current regulation of the motor current.

FIG. 3 is a schematic view of a current regulation of the motor current, in which the pump motor of the hydraulic brake device is used as a final control element. By varying the hydraulic pressure, it is possible to relieve electric motor 1 of the parking brake to various extents. The drive torque of electric motor 1 and therefore also the power consumption may therefore be kept at an essentially constant value. The regulation includes a node 11, in which regulation difference ($i_0-i$) is produced. This difference is supplied to a regulator 6 (pump motor controller), which outputs a specific control variable depending on the control algorithm. In the present example, pump motor 7 of the hydraulic pump forms the final control element of the regulation. The controlled system further includes brake caliper 8 and electric motor 1. A specific current of electric motor 1 therefore results depending on the strength of the hydraulic support.

Furthermore, speed ω of electric motor 1 is estimated from current i in block 9. Now, distance $s_{ch}$ which the brake piston has traveled may be calculated using the estimated speed value (block 10). The desired total clamping force is reached when distance $s_{ch}$ which the brake piston has traveled is equal to setpoint distance $s_{ch0}$. In order to check this, a differential value Δs is continuously calculated from actual distance and setpoint distance in a further node 12. As soon as the differential value is equal to zero, electric motor 1 and pump motor 7 are automatically turned off.

The electric motor-driven parking brake may be only hydraulically supported in those situations in which this is necessary for the proper function, e.g., if the slope of the roadway is greater than a specific value, e.g., 15%, or if it is recognized that provision of the clamping force solely by the electric motor is by itself inadequate for reasons of voltage or temperature. As long as the driver remains in the vehicle and the slope is<15%, for example, the hydraulics may be not switched on.

The electric motor-driven parking brake may also be designed, however, in such a way that the clamping force is sufficient to keep the vehicle stationary on slopes of up to 20%, for example. The hydraulic support would only be switched on in this case if the slope is>20%, for example, or a clamping force reserve is to be provided, in the case of a hot brake system, for example.

The present invention is explained in greater detail on the basis of concrete embodiments of the present invention, without being limited to the concrete specific embodiment.

LIST OF REFERENCE NUMERALS i current of the electric motor
$i_0$ instantaneous current upon reaching target clamping force $F_m$
u voltage of the electric motor
F clamping force
s distance of the nut on the spindle of the electromechanical brake device
ω speed of the electric motor
p pressure of the hydraulic brake device
$s_{ch0}$ setpoint distance for the brake piston to travel
$s_{ch}$ traveled distance of the brake piston
$\Delta s$ differential value between $s_{ch}(j)$ and $s_{ch0}$
$F_{est}$ instantaneous clamping force
$F_m$ target clamping force of the electromechanical brake device
$F_0$ instantaneous clamping force upon reaching target clamping force $F_m$
$F_{ges}$ target clamping force of the electromechanical brake device in combination with the hydraulic brake device
m slope
$m_0$ instantaneous slope upon reaching target clamping force $F_m$
1 electric motor
2 speed estimation
3 motor parameter estimation
4 clamping force estimation
5 setpoint value calculation
6 pump motor controller
7 pump motor
8 brake caliber
9 speed estimation
10 distance calculation
11 node
12 node
13-18 method steps

What is claimed is:

1. A method for setting a clamping force exerted by a parking brake, the method comprising:
regulating a power consumption of an electric motor-driven brake device to be at an essentially constant value throughout an operating phase in which the electric motor-driven brake device and a second brake device simultaneously exert respective partial clamping forces, wherein the simultaneous exertion of the partial forces by the electric motor-driven brake device and the second brake device begins at a beginning of the operating phase, continues throughout the operating phase, and ends at an end of the operating phase.

2. The method of claim 1, wherein the second brake device includes one of a hydraulic and a pneumatic brake device.

3. The method of claim 1, wherein the power consumption of the electric motor-driven brake device is regulated with the aid of a regulating device, which uses an actuator of the second brake device as a final control element.

4. The method of claim 1, wherein at least one of a distance covered by a brake piston, a speed of the electric motor, and another variable, from which the clamping force may be estimated, is determined from a current value.

5. The method of claim 1, wherein, during a first operating phase, the electric motor-driven brake device is operated exclusive of any other braking device, and a hydraulic brake device is subsequently switched on approximately upon reaching a specific target clamping force.

6. The method of claim 5, wherein a distance covered by a brake piston is determined in consideration of a current value.

7. A method for setting a clamping force exerted by a parking brake, the method comprising:
regulating a power consumption of an electric motor-driven brake device to be at an essentially constant value throughout an operating phase in which the electric motor-driven brake device and a second brake device simultaneously exert respective partial clamping forces;
wherein a slope of an increase of the clamping force is ascertained in an operating phase in which the electric motor-driven brake device is active exclusive of any other braking device.

8. The method of claim 7, wherein a setpoint distance, which a brake piston is to travel after reaching a specific target braking force, is determined with the aid of the slope.

9. A method for setting a clamping force exerted by a parking brake, the method comprising:
regulating a power consumption of an electric motor-driven brake device to be at an essentially constant value throughout an operating phase in which the electric motor-driven brake device and a second brake device simultaneously exert respective partial clamping forces;
wherein:
a distance covered by a brake piston is determined in consideration of a current value; and
a differential value is continuously determined from a distance for the brake piston to travel and an already traveled distance of the brake piston.

10. The method of claim 9, wherein the regulation of the power consumption includes regulating a current of the electric motor-driven brake device, the regulation of the current being executed until the differential value is zero.

11. A control device for setting a clamping force exerted by a parking brake, comprising:
an activating arrangement to activate an electric motor of the parking brake;
a second activating arrangement to activate an actuator of a second brake device;
a current regulating arrangement to regulate current of the electric motor to be at an essentially constant value throughout an operating phase in which both of the brake devices simultaneously exert force, wherein the simultaneous exertion of the partial forces by the electric motor-driven brake device and the second brake device begins at a beginning of the operating phase, continues throughout the operating phase, and ends at an end of the operating phase.

12. A control device for setting a clamping force exerted by a parking brake arrangement, comprising:
a current regulating arrangement to regulate a power consumption of an electric motor driven brake device to be at an essentially constant value throughout an operating phase in which the electric motor driven brake device and a second brake device simultaneously exert a clamping force, wherein the simultaneous exertion of the partial forces by the electric motor driven brake device and the second brake device begins at a beginning of the operating phase, continues throughout the operating phase, and ends at an end of the operating phase.

* * * * *